Sept. 1, 1953  W. O. MASHBURN, JR., ET AL  2,650,856
BODY FOR DELIVERY TRUCKS

Filed July 24, 1950  4 Sheets-Sheet 1

INVENTORS.
WILLIAM O. MASHBURN, JR.
GUSTAV A. BROETZLER
BY KENNETH KINNAIRD

Zugelter & Zugelter
Attys.

Sept. 1, 1953 W. O. MASHBURN, JR., ET AL 2,650,856
BODY FOR DELIVERY TRUCKS
Filed July 24, 1950 4 Sheets-Sheet 2

INVENTOR.
WILLIAM O. MASHBURN, JR.
GUSTAV A. BROETZLER
BY KENNETH KINNAIRD

Zugelter & Zugelter
Attys.

Sept. 1, 1953   W. O. MASHBURN, JR., ET AL   2,650,856
BODY FOR DELIVERY TRUCKS
Filed July 24, 1950   4 Sheets-Sheet 3
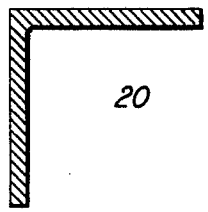
FIG. 12.
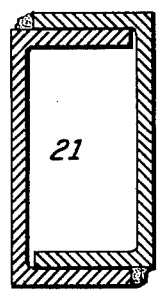
FIG. 13.
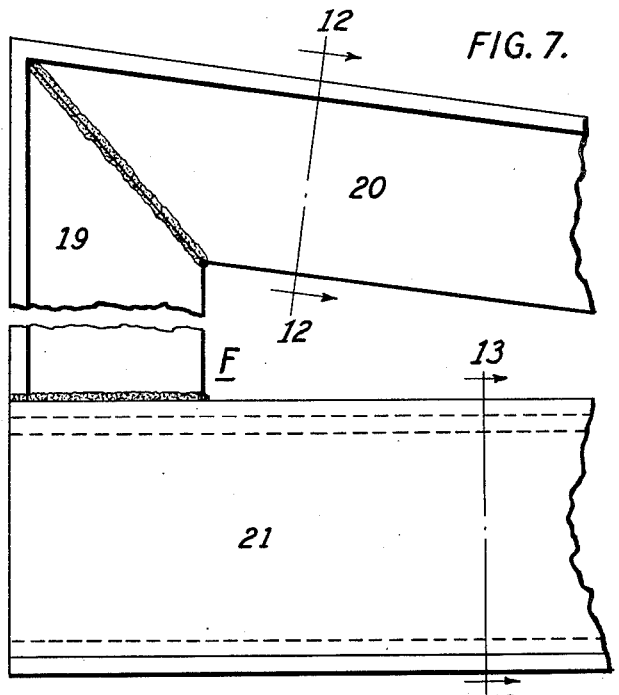
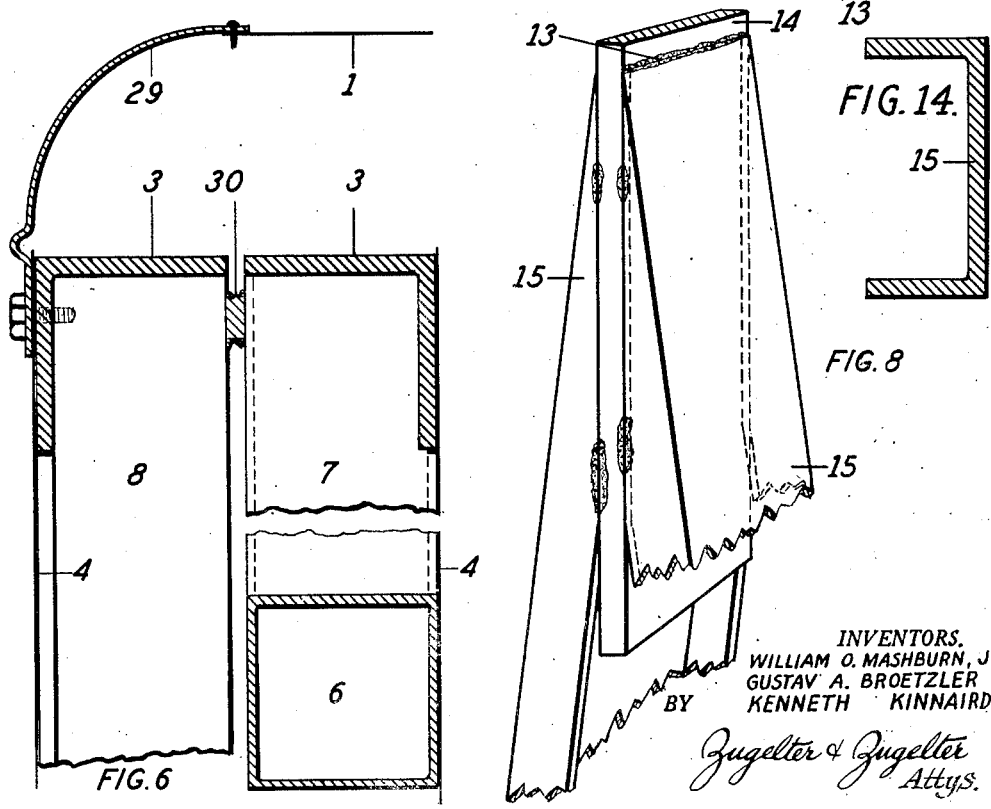
INVENTORS.
WILLIAM O. MASHBURN, JR.
GUSTAV A. BROETZLER
KENNETH KINNAIRD
BY Zugelter & Zugelter
Attys.

Sept. 1, 1953  W. O. MASHBURN, JR., ET AL  2,650,856
BODY FOR DELIVERY TRUCKS
Filed July 24, 1950  4 Sheets-Sheet 4
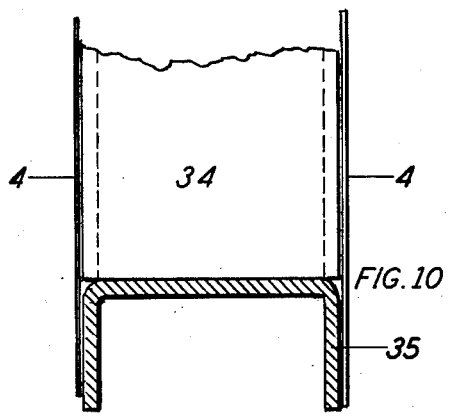
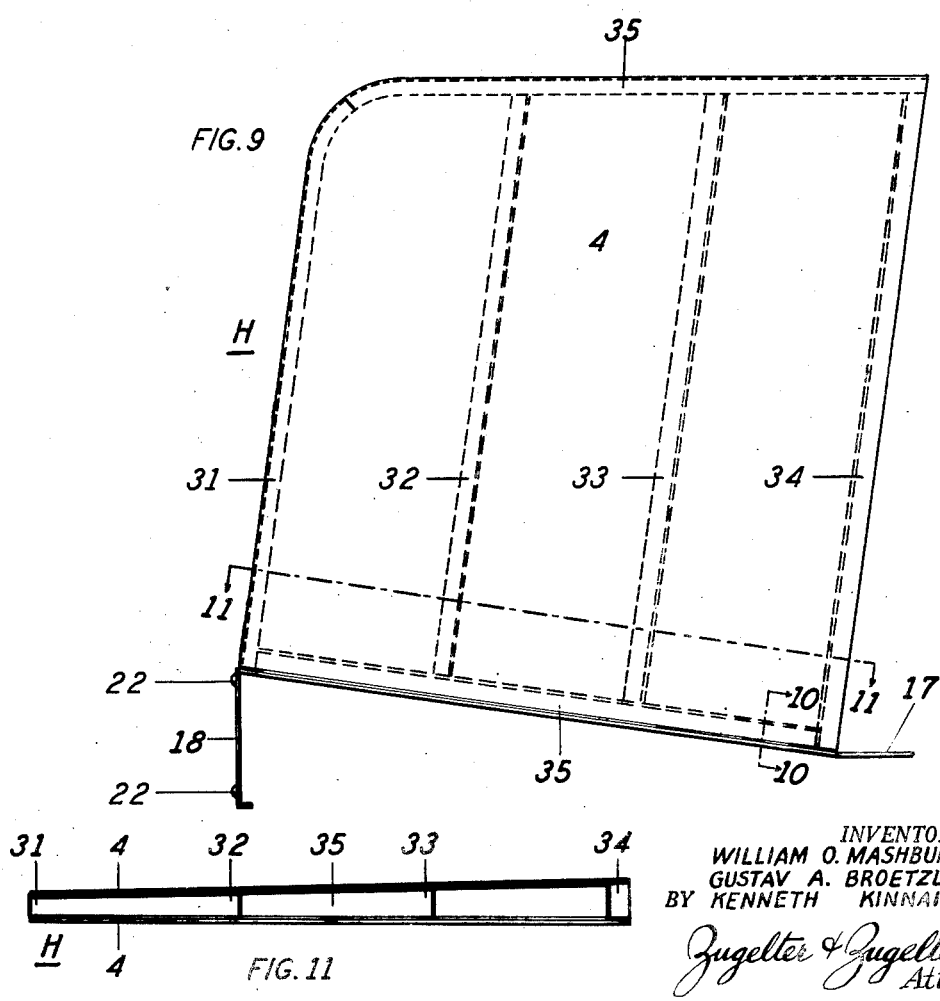
INVENTORS.
WILLIAM O. MASHBURN, JR.
GUSTAV A. BROETZLER
BY KENNETH KINNAIRD
Zugelter & Zugelter
Attys.

Patented Sept. 1, 1953

2,650,856

UNITED STATES PATENT OFFICE 2,650,856

BODY FOR DELIVERY TRUCKS

William O. Mashburn, Jr., and Gustav A. Broetzler, Cincinnati, Ohio, and Kenneth Kinnaird, Kenton County, Ky., assignors to The Coca-Cola Bottling Works Co., Cincinnati, Ohio, a corporation of Ohio Application July 24, 1950, Serial No. 175,507

1 Claim. (Cl. 296—28)

This invention relates to a truck for delivering cases of bottles and more particularly to a truck body having readily accessible open bins on opposite sides of the center line thereof in which cases of bottles may be stacked.

An object of this invention is to provide a truck body of this type which is sturdy in construction and light in weight.

A further object of this invention is to provide a truck body of this type having a low floor for convenience in loading and unloading.

A further object of this invention is to provide a truck body of this type having a floor which slopes downwardly from the sides thereof toward the longitudinal center line of the truck so that stacks of cases will be inclined to lean inwardly toward the center of the truck body.

A further object of this invention is to provide a truck body of this type having partitions that separate the stacks of cases, the partitions being so arranged and constructed that the stacks of cases are wedged between pairs of such partitions.

The above and other objects and features of the invention will in part be apparent and will in part be obvious from the following detailed description, and the drawings, in which:

Fig. 6 is a view in vertical section showing details of construction of the rear panel of the truck body;

Fig. 7 is an enlarged fragmentary view in side elevation showing details of one of the bolster frames which support the truck body;

Fig. 8 is an enlarged perspective view looking in the direction of the arrows 8—8 of Fig. 4;

Fig. 9 is a view in side elevation showing details of construction of one of the partitions in the truck body;

Fig. 10 is a sectional view taken along a line 10—10 of Fig. 9;

Fig. 11 is a sectional view taken along a line 11—11 of Fig. 9;

Fig. 12 is a sectional view taken along a line 12—12 of Fig. 7;

Fig. 13 is a sectional view taken along a line 13—13 of Fig. 7; and

Fig. 14 is a sectional view of one of the leg members of one of the separator frames.

In the following detailed description, and the drawings, like reference characters indicate like parts.

Figure 5:
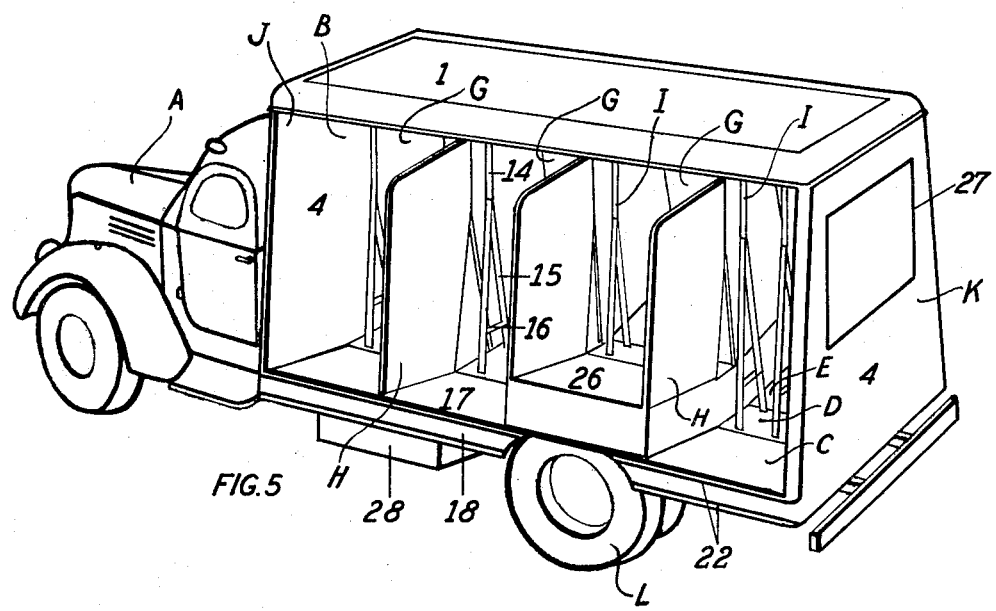
Fig. 5 is a perspective view showing the truck and truck body.

In Fig. 5 is shown a truck A on which is mounted a truck body B embodying a form of this invention.

Figure 3:
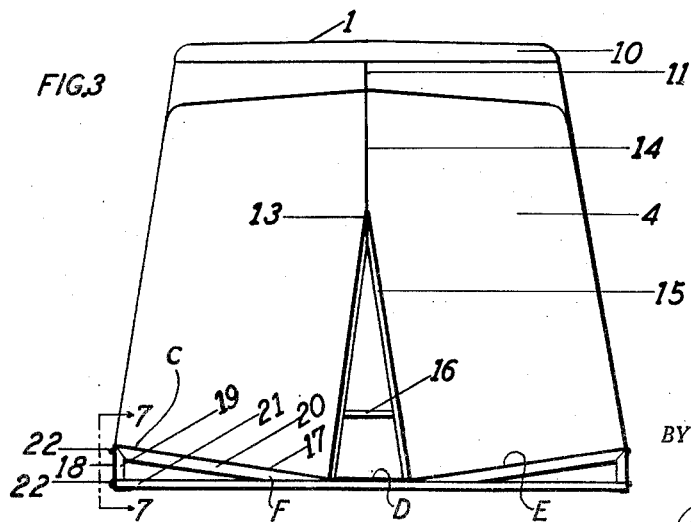
Fig. 3 is a view in section taken along a line 3—3 of Fig. 4.

As shown in Figs. 3 and 5, the floor of the truck body is divided into three sections, C, D, and E. Section D extends along the longitudinal center line of the truck body and may be substantially horizontal, while sections C and E, on either side of central section D, slope downwardly from the respective sides of the body toward the center line thereof. Cases of bottles (not shown) may be stacked on floor sections C and E. Because of the slope of the floor panels, the cases are prevented from sliding outwardly of the truck body as the truck passes around curves or over road beds that slope sideways.

The floor sections are supported by bolster frames F (Figs. 3 and 7) secured to the chassis of the truck in any suitable manner. The bolster frames form the main support for the truck body and the floor thereof. Each bolster frame includes a lower member 21 (Figs. 7 and 13) which extends across the truck below the body thereof and on which upper members 19 and 20 are supported. Each upper member 20 slopes downwardly and inwardly from one of the outer edges of the truck body thereby forming a support for floor sections C and E. A plate which forms the floor sections is indicated at 17. Members 19 are covered by vertical skirt strips or sheets 18 attached thereto. Sheets 18 extend along each side of the truck body below floor sections C and E, and are protected by rub rails 22 (Figs. 3 and 5) welded thereto.

Figure 4:
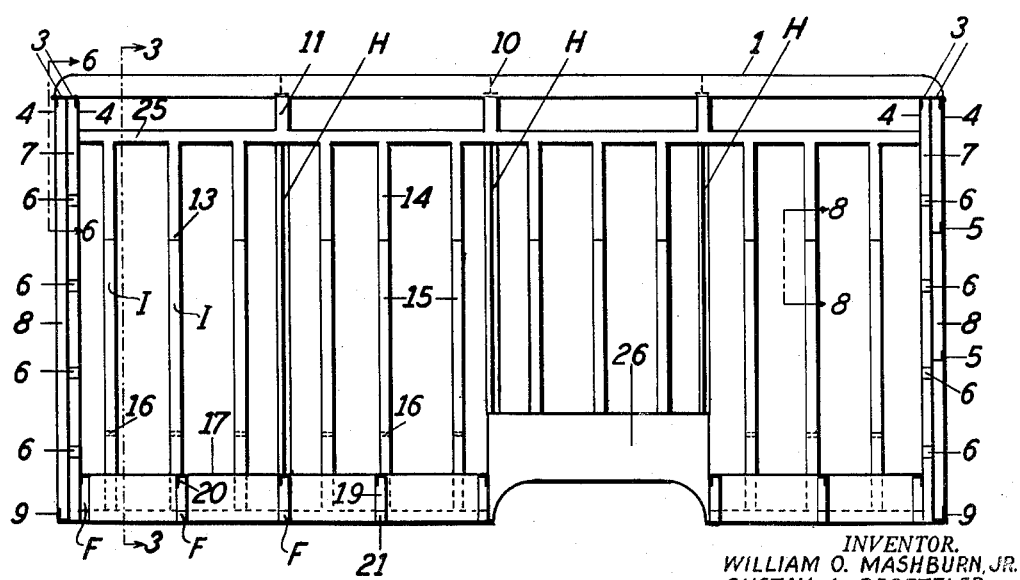
Fig. 4 is a view in side elevation of the truck body, a skirt along the lower edge thereof being removed.

The truck body is divided into sections or bins G (Fig. 5) by partitions H which extend upwardly from the floor. In Fig. 11, one of the partitions is shown in substantially horizontal section. As shown in Fig. 11, the framework of the partition includes a series of upright substantially vertical channel shaped frame members 31, 32, 33, and 34 of progressively increasing width. Frame members 31–34 inclusive are connected together by top and bottom frame members 35 which may be tapered to accommodate the upright frame members. Layers of sheeting 4 form a cover or skin for the sides of the frame members. As shown in Figs. 4 and 11, each partition is of wedge shape with the thick side at the center line of the truck body. The partitions form side walls for the bins. As constructed the opposite side walls of each bin converge toward the center line of the truck body so that the innermost cases of a stack placed in the bins are wedged in place between the partitions.

The bins on either side of the truck body are separated or spaced by spacer frames I (Figs. 4 and 5) of inverted Y-shape. As shown in Fig. 3, each frame I includes a pair of channel shaped leg members 15 which are beveled at their upper ends and welded to an upright bar 14 along a line 13. The lower ends of leg members 15 are welded to the floor, while bar 14 extends upwardly to a longitudinal frame bar 25 (Fig. 4) which is supported by the front and rear panels and to which the upper end of bar 14 is welded. The leg members of each frame I are spaced and stiffened by an intermediate cross bar 16, which may be welded at its opposite ends to the leg members.

The frames I serve as stops or spacer members for stacks of cases in the bins on opposite sides of the center line of the truck body and limit the extent to which the stacks of cases can slide down the floor sections C and E toward the center line and also serve to support frame bar 25 to prevent downward buckling thereof. Frame bar 25 in turn supports roof truss members 10 which carry the roof panel 1 of the truck. The roof truss members are mounted on upright flat iron members 11 which extend upwardly from longitudinal frame bar 25 to support the roof panel.

Figure 1:
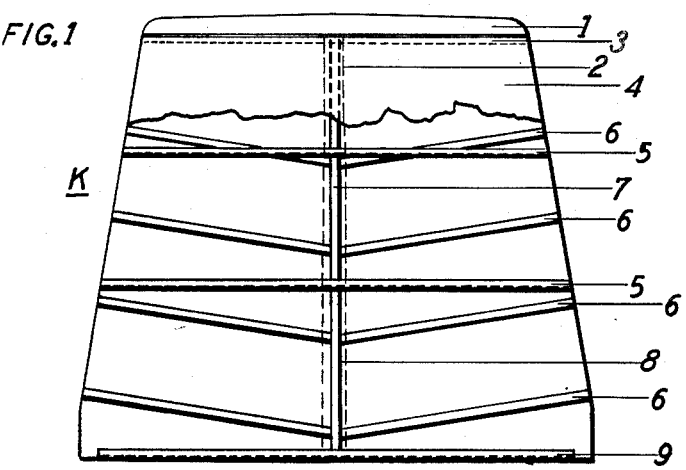
Figure 1 is a view in end elevation, partly broken away, showing the rear panel of a truck body constructed in accordance with an embodiment of this invention.
Figure 2:
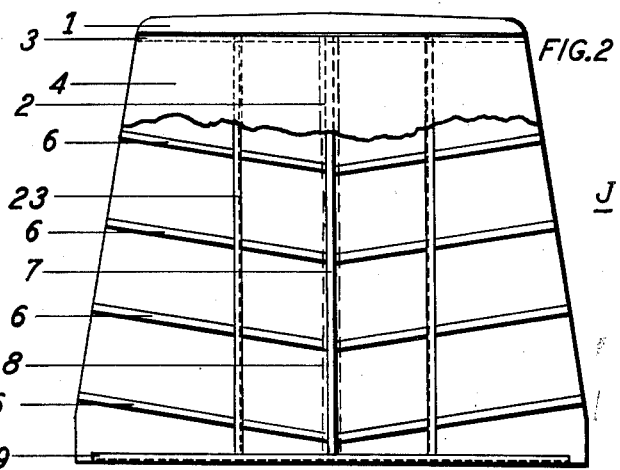
Fig. 2 is a view in end elevation, partly broken away, showing the front panel of the truck body.

Front and rear panels J and K of the truck body are each built up of a plurality of frame members, as shown most clearly in Fig. 6. As shown in Figs. 1 and 6, the rear panel includes a plurality of frame members 3, 6, 7, and 8 to which a thin metal sheeting or skin 4 is secured and which covers the frame members. The front and rear panels are generally similar in construction, as shown in Figs. 1 and 2, with the exception that the framework of front panel J (Fig. 2) includes additional vertical members 23 while the framework of rear panel K (Fig. 1) includes additional horizontal frame members 5. The front and rear frame members support cove strips 29 (Fig. 6), only one of which is shown in detail, which in turn support the ends of roof panel 1.

As shown in Fig. 5, the truck body is provided with a drop frame chassis in which the major portion of the floor of the truck is disposed below the level of the tops of wheels L so that the bins are readily accessible and convenient to load and unload. The section of the floor above the wheels is raised, as indicated at 26 in Fig. 5, to provide a wheel box embracing the tops of the rear wheels of the truck.

In the drawings, numerals have been applied to other portions of the truck body as follows:

An upright flat iron frame member of the rear panel is indicated at 2. Transverse lower frame members of angle shape which form part of the framework of the front and rear panels are indicated at 7.

In Fig. 5, an aluminum molding frame for the purpose of receiving advertising is indicated at 27. At 28 is indicated a sheet metal box for the storage of advertising material, etc. A similar box (not shown) for tools and other equipment may be suspended on the opposite side of the truck body.

Throughout the drawings, the numeral 4 indicates a light gauge, metal sheeting or skin which covers the various panels of the truck body. The numeral 17 indicates a somewhat heavier gauge sheet metal flooring.

The sloping floor and converging walls of the bins of the truck body hold stacks of cases firmly in place in the bins without danger of the cases sliding free.

The truck body illustrated in the drawings, and described above is subject to structural modification without departing from either the spirit or the scope of the invention as set forth in the appended claim.

Having described our invention, what we claim as new and desire to secure by Letters Patent is:

A body for a bottle carrying truck which comprises a plurality of bolster frames extending transversely of the bottom of said body, each of said bolster frames including a main transverse member extending substantially the width of the truck body, an upstanding skirt supporting member at each end of said main transverse member, and a floor supporting member extending downwardly and inwardly from the upper end of each skirt supporting member to the main transverse member, a floor mounted on the floor supporting members, said floor including two sections disposed on opposite sides of the longitudinal center line of the truck body, each of said sections of the floor sloping downwardly toward the center line, and a plurality of transverse panels extending upwardly from the floor and dividing the body into a plurality of bins, said panels comprising spaced side walls diverging from each other from their outer edges toward the longitudinal center line of the truck and cooperating with the adjacent panels to form wedge shaped spaces therebetween, the floor of each of said bins terminating short of the center line, said bins each being adapted to receive a stack of cases of bottles with the innermost stack wedged between said panels.

WILLIAM O. MASHBURN, Jr.
GUSTAV A. BROETZLER.
KENNETH KINNAIRD.

References Cited in the file of this patent

UNITED STATES PATENTS

| Number | Name | Date |
| --- | --- | --- |
| D. 157,442 | Schwartzman et al. | Feb. 21, 1950 |
| 2,061,673 | Robinson | Nov. 24, 1936 |

OTHER REFERENCES

"A Unit Load Transfer System For Air Cargo" by C. W. Gordon, "Flying" Magazine, pages AC-10 to 12 and 21, May 1944, vol. 34, No. 5.